US006006560A

United States Patent [19]

DeVries

[11] Patent Number: 6,006,560

[45] Date of Patent: Dec. 28, 1999

[54] LATCH MECHANISM FOR A DOOR

[75] Inventor: Ricky DeVries, Forest City, Iowa

[73] Assignee: Winnebago Industries, Inc., Forest City, Iowa

[21] Appl. No.: 08/975,194

[22] Filed: Nov. 20, 1997

Related U.S. Application Data

[60] Provisional application No. 60/063,271, Oct. 27, 1997.

[51] Int. Cl.[6] .......... B60R 25/02

[52] U.S. Cl. .......... 70/208; 70/100; 292/38

[58] Field of Search .......... 70/99, 100, 208–212; 292/38, 34–36

[56] References Cited

U.S. PATENT DOCUMENTS

| | | | |
|---|---|---|---|
| 3,027,188 | 3/1962 | Eichstadt | 292/38 X |
| 3,044,814 | 7/1962 | Pelcin | 70/99 X |
| 3,834,747 | 9/1974 | Slovensky | 292/38 |
| 3,910,611 | 10/1975 | Slovensky | 292/38 |
| 4,012,066 | 3/1977 | Salvatore | 292/38 X |
| 4,134,281 | 1/1979 | Pelcin | 70/208 |
| 4,263,747 | 4/1981 | Coltrin et al. | 292/38 |
| 4,263,795 | 4/1981 | Van Gompel | 70/100 X |
| 4,395,892 | 8/1983 | Remington | 292/38 |
| 4,461,160 | 7/1984 | Van Gompel | 70/100 |
| 4,683,736 | 8/1987 | Weinerman et al. | 70/208 |
| 4,951,486 | 8/1990 | Braun et al. | 70/208 |
| 5,058,937 | 10/1991 | Miehe et al. | 292/34 |
| 5,452,596 | 9/1995 | Yamada | 70/208 |
| 5,469,725 | 11/1995 | Yamada | 70/208 |
| 5,556,145 | 9/1996 | Takasaki | 70/208 X |

*Primary Examiner*—Suzanne Dino Barrett
*Attorney, Agent, or Firm*—Burd, Bartz & Gutenkauf

[57] ABSTRACT

A door hinged to a structure has a latch mechanism holding the door in a closed locked position. The latch mechanism has spring biased bolt units secured to opposite sides of the door connected with a single cable. A handle and lock assembly located in a recess in the outside of the door between the bolt units and mounted on the door has a hook with a groove accommodating the cable. When the handle is moved from its locked position cable is pulled to release the bolts allowing the door to be moved to its open position.

13 Claims, 7 Drawing Sheets

LATCH MECHANISM FOR A DOOR

CROSS REFERENCE TO RELATED APPLICATION

This application is a continuation of U.S. Provisional Application Ser. No. 60/063,271 filed Oct. 27, 1997.

FIELD OF THE INVENTION

The present invention relates to a latch mechanism for a door. More particularly, the latch mechanism has a pair of spring biased bolts connected with a cable which cooperates with a handle and lock assembly to selectively maintain the bolts in locked and unlocked positions.

BACKGROUND OF THE INVENTION

Door lock mechanisms are used with sliding, swinging and overhead doors to close doorways and openings in structures, such as building and vehicles. One type of door lock mechanism has spring biased bolt units that are normally in the lock position to keep the door closed. A rotatable bell crank and rods connected to the bolt units are used to release the bolts to allow the door to be moved to an open position. The bell crank and rods are positioned adjacent the outside of the door. In some installations, the rods are located within the door between the bell crank and bolt units. The areas within the door surrounding the rods have little or no insulation which results in heat loss through the door from heated spaces, such as vehicle compartments. J. V. Gompel in U.S. Pat. No. 4,461,160 discloses a bell crank and rod assembly for actuating spring biased bolt units for a door and an alternative bolt unit release mechanism. This mechanism uses a cable connected to bolt units mounted on opposite sides of a door. A handle pivotally mounted on a frame attached to the outside of the door is connected to the cable. A key lock on the handle retains the handle in a closed locked position. When the lock is allowing the handle to be pivoted upwardly to pull cable to release the bolt units. The mount for the handle requires an opening through the door and an interior member located in the opening.

SUMMARY OF THE INVENTION

The invention is an improved latch mechanism for a hinged door having a relatively flat profile which fits within the thickness of the door and has a single operational function. The latch mechanism has minimum parts that are economically manufactured and requires less labor and time for installation on a door than prior door latches. The compact relationship of the latch mechanism and the door has a clean appearance that does not require any type of cosmetic cover. The latch mechanism is sealed from the exterior of the door to eliminate water and dirt leaks.

The latch mechanism is installed on a door having inside and outside walls with a recess in the outside wall closed with the inside wall. Insulation material is located between the walls. A hinge pivotally mounts the door on a structure to allow the door to be moved between open and closed positions. Spring biased latch units having lock bolts fastened to opposite side sections of the door cooperate with fixed latch plates on the structure to lock the door in it's closed position. A single cable located within the door connected to the lock bolts extends across the recess. The insulation material has a small passage accommodating the cable to minimize the heat loss through the door and allowing the cable to move longitudinally in the passage to release the lock bolts. A handle and lock assembly located in the recess in the door cooperates with the cable to move the lock bolts to their release positions. Handle and lock assembly has a case located in the recess and secured with fasteners to the continuous inside wall of the door and retained in sealed relation with the outside wall of the door to prevent water, dust, and dirt from blowing into and through the door. A handle is pivotally mounted on the case for movement between a first lock position and a second unlock position. A key operated lock mounted on the handle has a latch member that engages a portion of the case to retain the handle in the lock position. The key is used to unlock the latch member to allow the handle to be moved to its second position. An inwardly directed hook joined to the back of the handle has a groove accommodating the cable so that when the handle is moved to the second position, cable is pulled to release the lock bolts from the latch plates allowing the door to swing to an open position. The casing has channels on opposite sides of the hook providing bearing and guide surfaces for the cable which prevent the cable from cutting into the insulation material when the cable is pulled by movement of the handle to the second position.

The handle has a flat outside face generally parallel with an outside flange of the case providing the handle and lock assembly with a low profile which allows the case to fit within a relatively thin laminated door. The handle and case do not have any exposed elements which can catch on exterior objects and interfere with movement of objects and persons adjacent the door. The latch mechanism does not have any exposed mechanisms that fail, jamb or wear out.

These and other objects, aspects, and advantages of the latch mechanism of the invention are set out in the following detailed description in conjunction with the drawings.

DESCRIPTION OF PREFERRED EMBODIMENT

Figure 1:
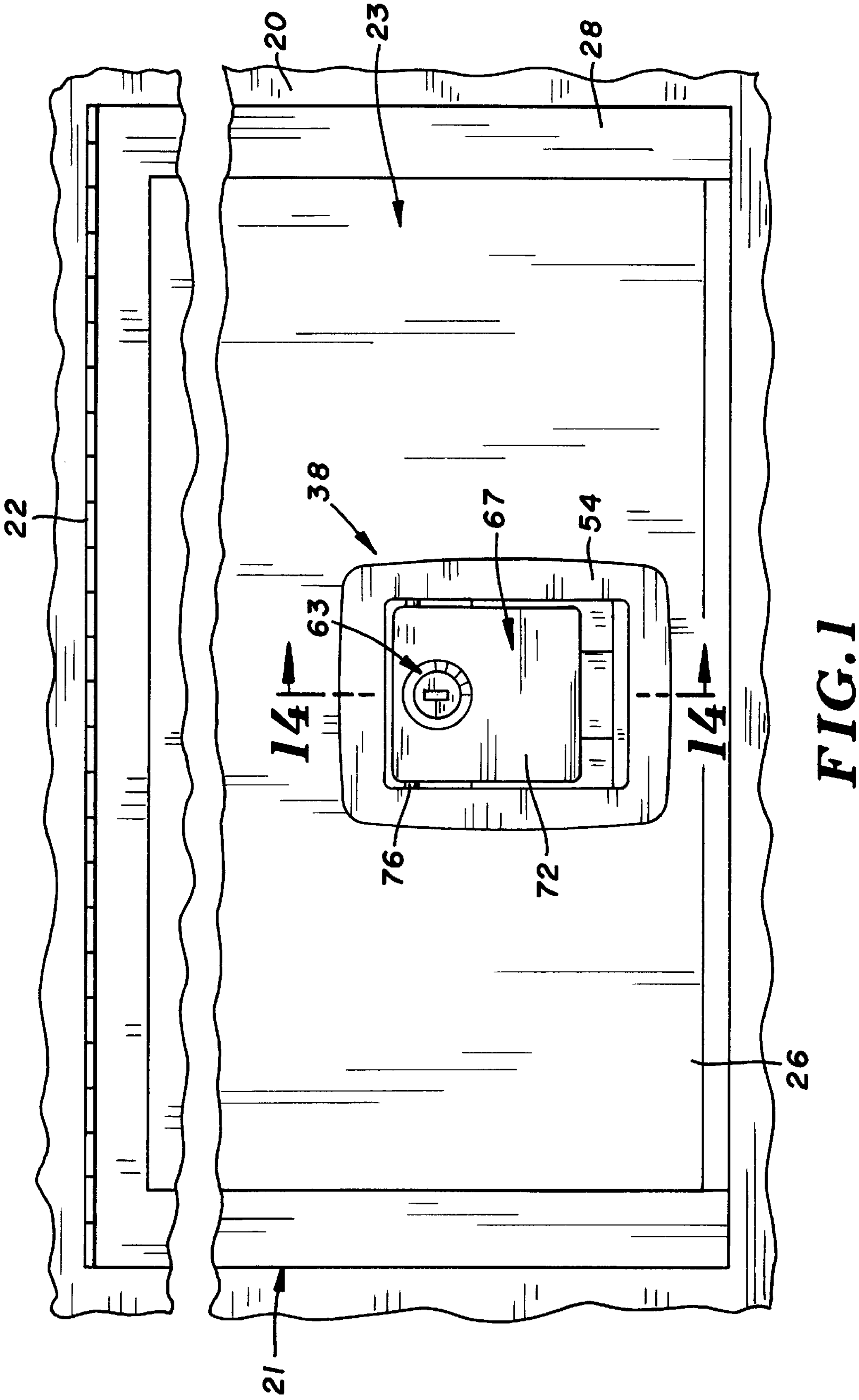
FIG. 1 is a foreshortened front elevational view of a door equipped with the door latch mechanism of the invention.
Figure 2:
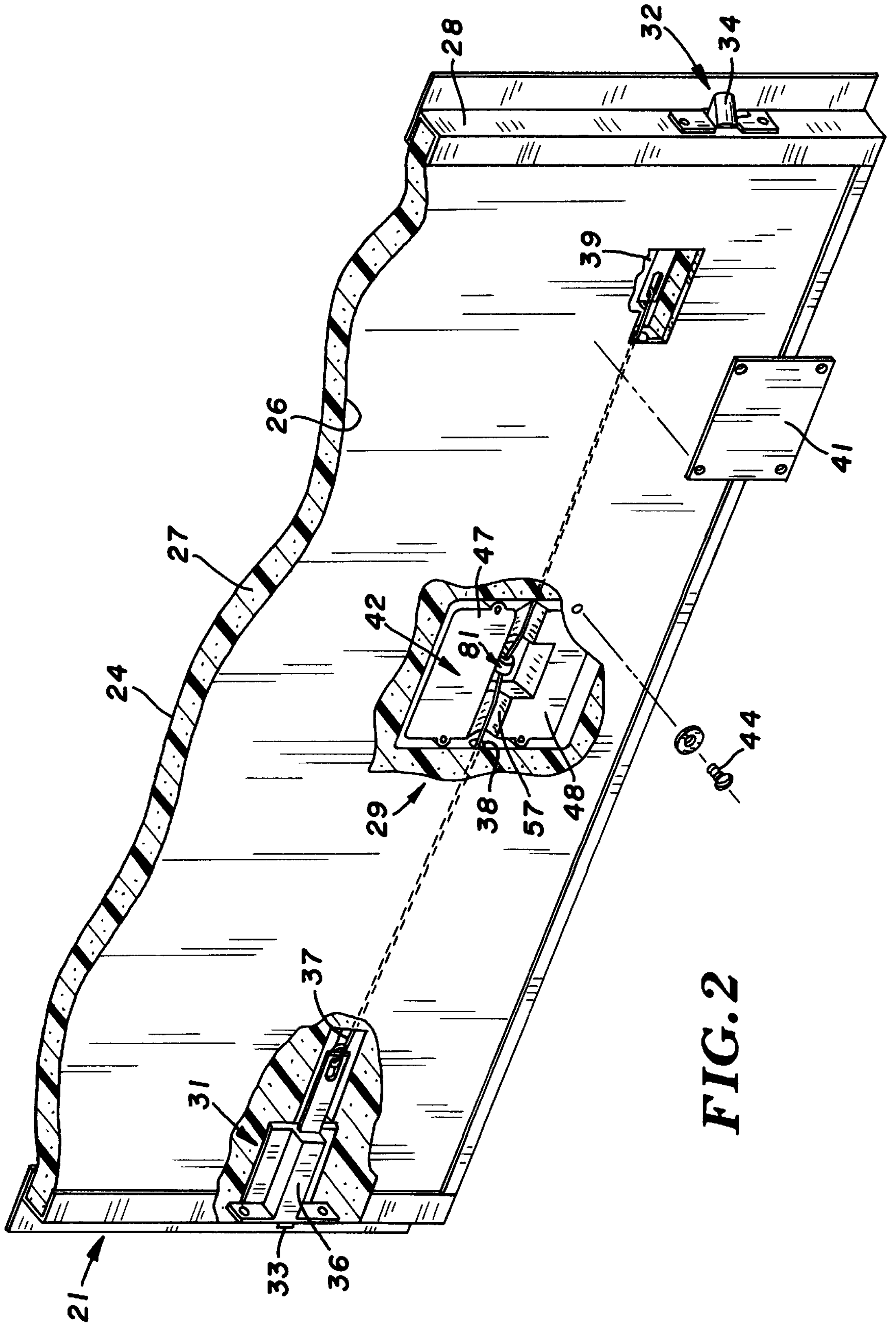
FIG. 2 is a perspective view, partly sectioned of the back of the door of FIG. 1 having the door latch mechanism of the invention.
Figure 4:
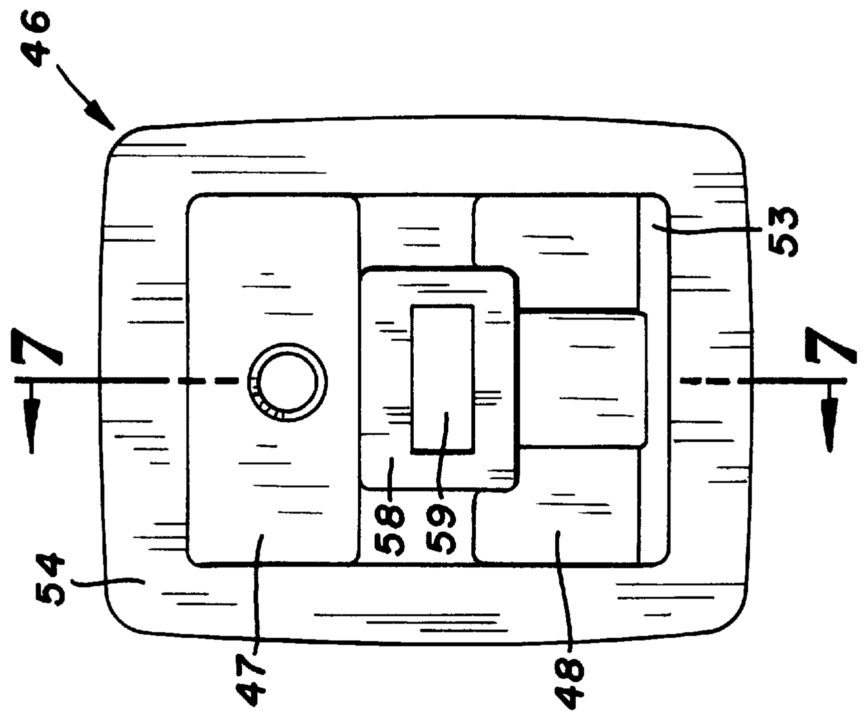
FIG. 4 is a front elevational view of FIG. 3.
Figure 3:
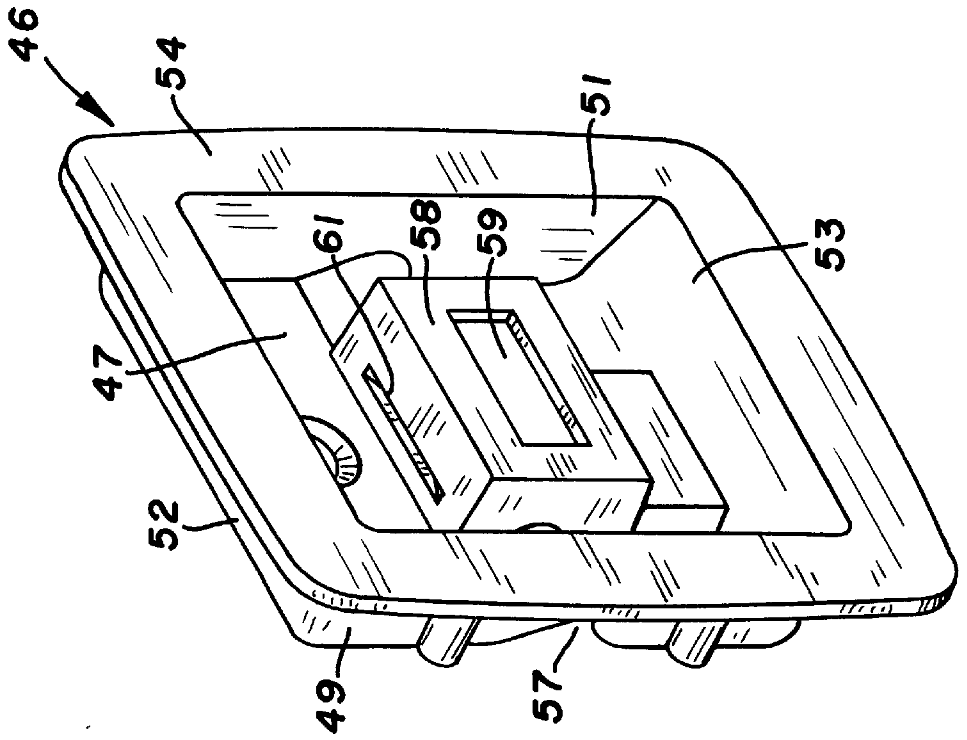
FIG. 3 is a perspective view of the body of the latch mechanism of FIG. 1.
Figure 5:
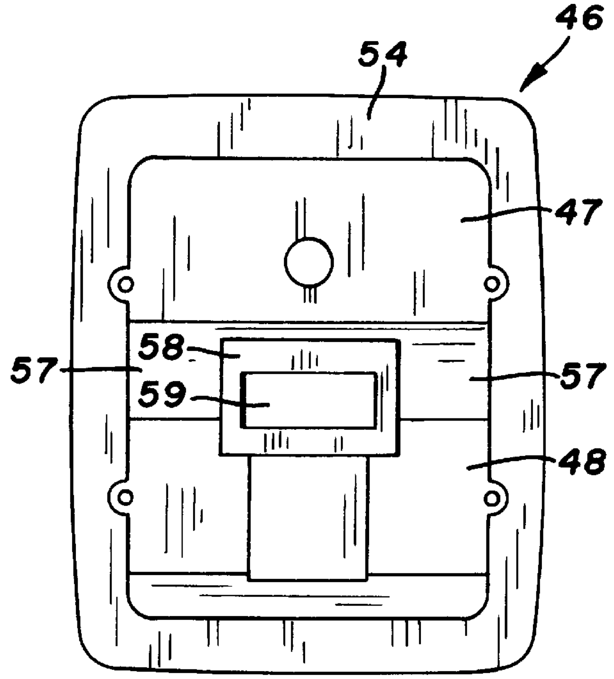
FIG. 5 is a rear elevational view of FIG. 3.
Figure 6:
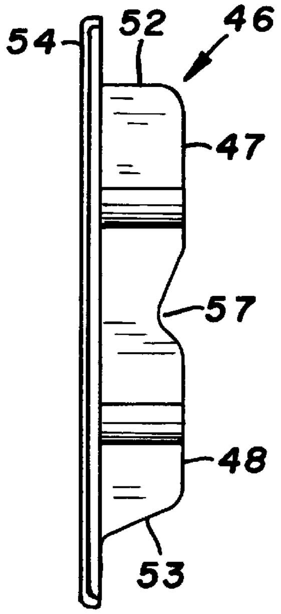
FIG. 6 is a side elevational view of FIG. 5.
Figure 7:
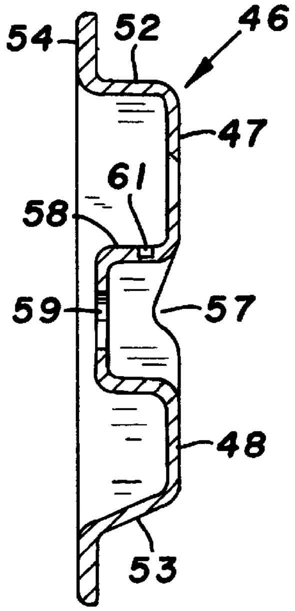
FIG. 7 is a sectional view taken along line 7—7 of FIG. 4.
Figure 8:
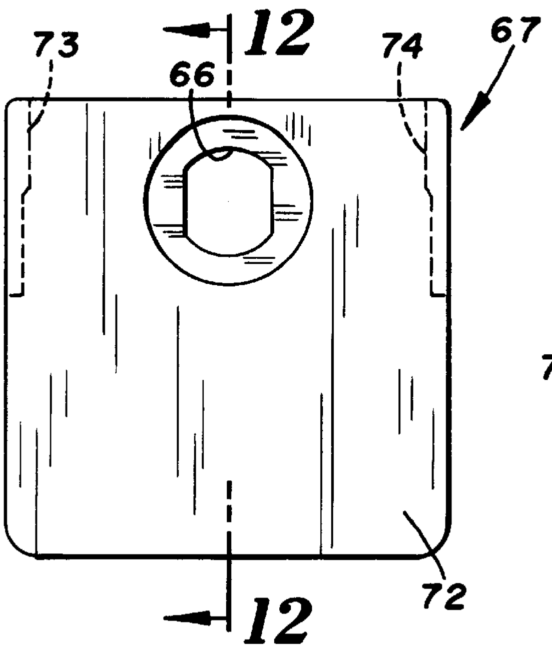
FIG. 8 is a front elevational view of the handle and hook of the latch mechanism of FIG. 1.
Figure 9:
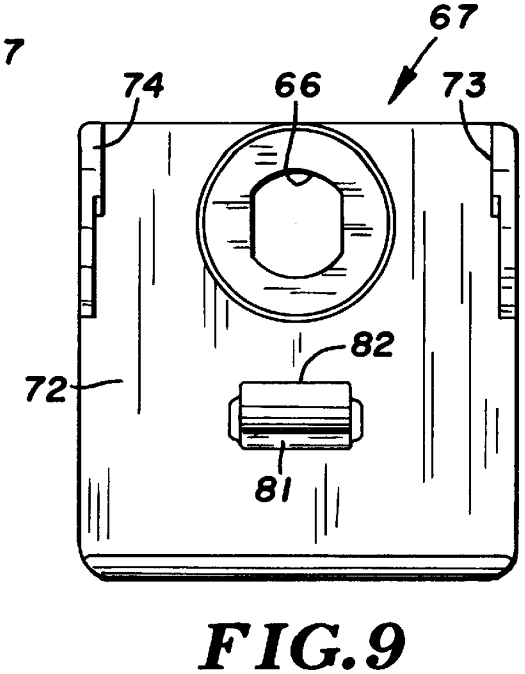
FIG. 9 is a rear elevational view of the handle and hook of FIG. 8.
Figure 10:
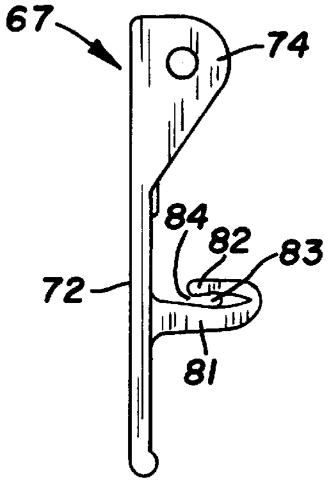
FIG. 10 is a side elevational view of the handle and hook of FIG. 8.
Figure 11:
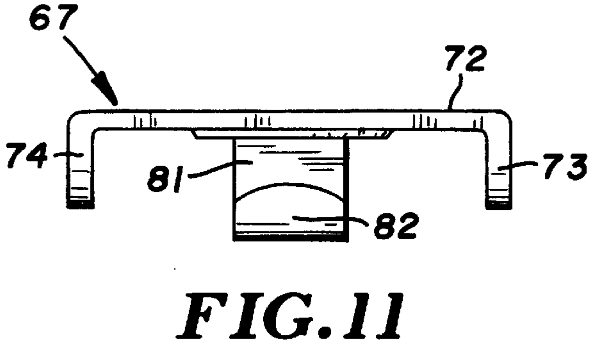
FIG. 11 is a top plan view of the handle and hook of FIG. 8.
Figure 12:
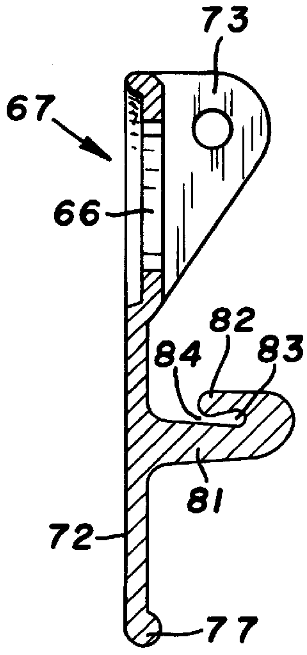
FIG. 12 is an enlarged sectional view taken along long line 12—12 of FIG. 8.

Referring to FIGS. 1 and 2, there is illustrated a structure 20, such as a wall of a vehicle or building, having a generally rectangular doorway open to a chamber closed with a door 21. A horizontal hinge 22 pivotally mounts the top of door 22 to adjacent portions of structure 20. The vehicle is of a type having compartments, such as a motor home, closed with generally flat doors. The doors are located in generally vertical position to close the compartments. The compartments are opened by swinging the doors upwardly. The latch mechanism 29 of the invention operates to lock the doors in closed positions.

Door 21 has a flat panel 23 with an outside wall 24 and inside wall 26 of metal or plastic sheet material. A core 27 of insulation material, such as foam polyurethane, is located between and secure to walls 24 and 26 to provide door 21 with heat insulation and increased strength. A metal frame 28 is secured to the outer peripheral edges of panel 23. The top of frame 28 is fastened to hinge 22 to allow door 21 to swing about the axis of hinge 22 between open and closed positions.

Door 21 is retained in a closed position with a door latch mechanism indicated generally at 29. As shown in FIG. 2, door latch mechanism 29 has a pair of latch bolt units 31 and 32 mounted on opposite sides of door frame 28 and between panel walls 24 and 26. Latch bolt units 31 and 32 are conventional spring biased latches having plungers or bolts 33 and 34 reciprocally mounted in housing 36 fastened to the sides of frame 28. Housings 36 accommodates coil springs (not shown) that bias bolts 33 and 34 away from frame 28 into locking engagement with latch plates (not shown) secured to structure 20 adjacent latch bolt units 31 and 32. An example of a latch bolt unit is shown by M. J. Solvensky Jr. in U.S. Pat. No. 3,910,611. Other types of latch bolt structures can be used to hold door 21 in its closed position.

A cable 37 is threaded through a small hole or passage 38 in core 38. Passage 38 is a small longitudinally cylindrical hole aligned with bolts 33 and 34 and spaced inwardly from walls 24 and 26. The hole can have a square or rectangular shape. The small passage 38 has minimum interference with the insulation of core 27 and strength of the door. One end of cable 37 is fastened to bolt 33. The opposite end of cable 38 is fastened to bolt 34. Inside wall 26 and core 27 has a recess or cut out 39 adjacent the inside end of bolt 34. Recess 39 provides a space to permit cable 37 to be fastened to bolt 34. A plate 41 secured to inside wall 26 covers recess 39 after cable 37 is connected to bolt 34.

Figure 13:
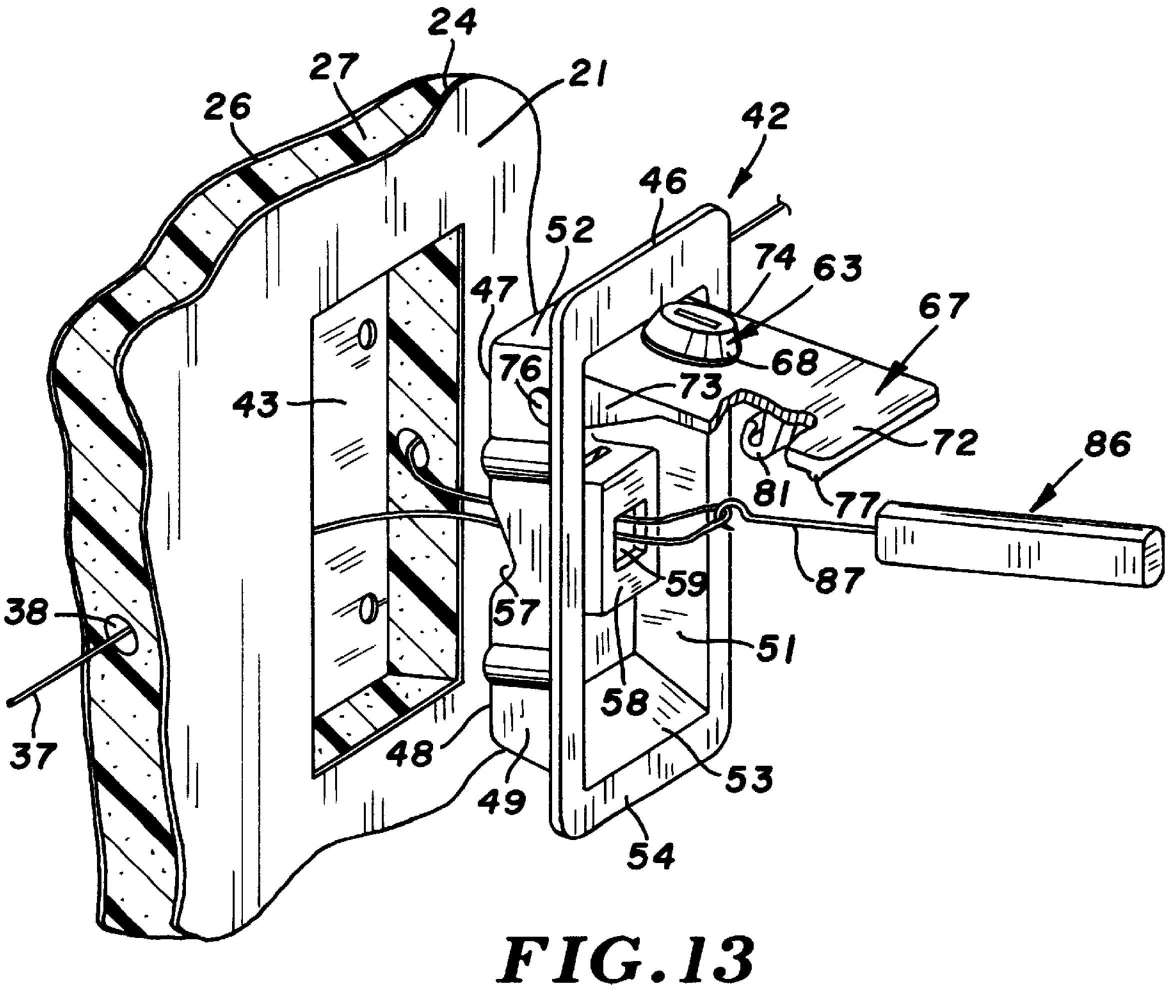
FIG. 13 is a perspective view of the latch mechanism and door showing the procedure to connect the cable to the hook on the handle.
Figure 14:
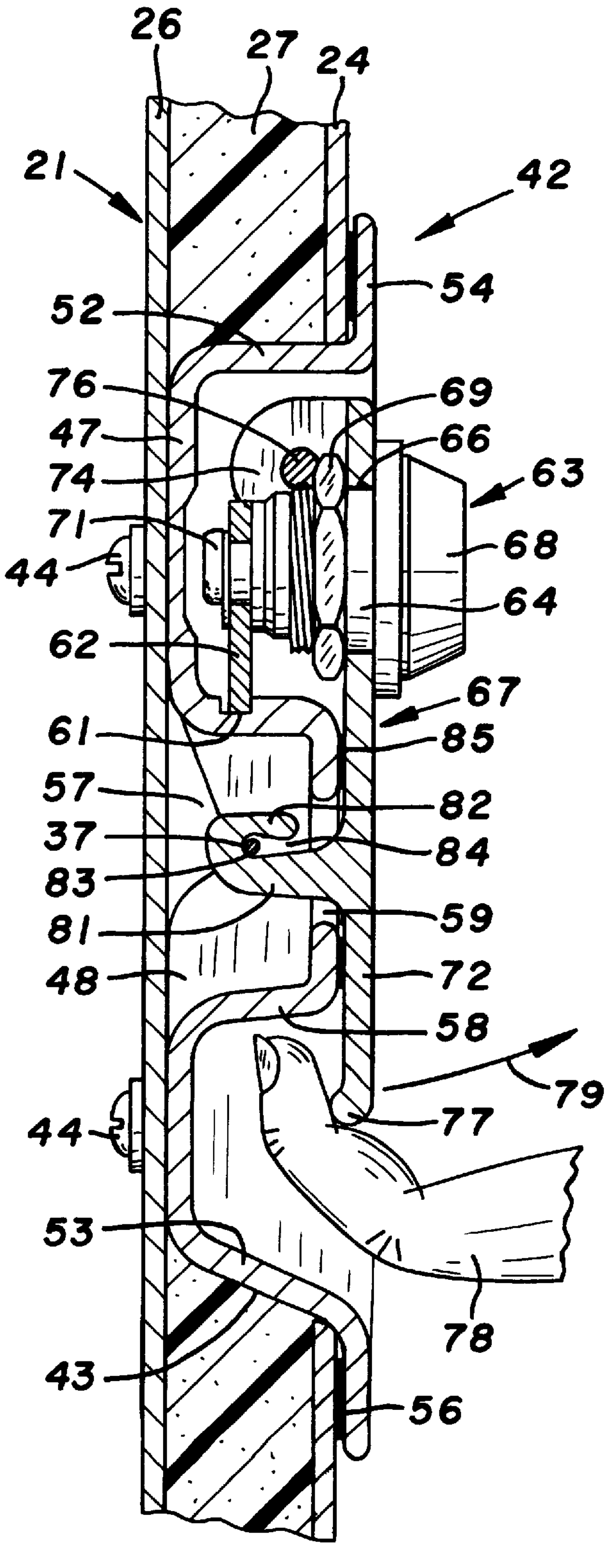
FIG. 14 is an enlarged sectional view taken along line 14—14 of FIG. 1.

A handle and lock assembly 42 mounted on the central portion of door 21 cooperates with cable 37 to move bolts 33 and 34 to release positions so that door 21 can be pivoted to an open position. As shown in FIG. 13, door 21 has a rectangular recess 43 in outside wall 24 and core 27. The inside wall 26 is continuous adjacent the back of recess 43. A plurality of bolts 44 extended through holes in wall 26 firmly secure handle and lock assembly 42 to wall 26 and hold the assembly in a sealed relationship with door 21. Handle and lock assembly 42 has a case 46 with back walls 47 and 48, side walls 49 and 51, a top wall 52 and bottom wall 53. An outer peripheral flange 54 joined to side walls 49, 51 and top and bottom walls 52, 53 extends outwardly adjacent outside wall 24. A flat seal 56, shown in FIG. 14, is located between flange 54 and the portion of wall 24 surrounding recess 43. Bolts 44 hold flange 54 and seal 56 in firm engagement with wall 24 and retain side walls 49, 51 and top and bottom walls 52, 53 in engagement with wall 24 and core 27. Seal 56 prevents moisture, air and dirt from entering the interior of door 21. Back walls 47 and 48 are held flat against the inside of wall 26. Handle and lock assembly 42 has a low or thin profile with substantially all of housing 46 being located within door 21.

The middle of the back of case 46 has horizontal channels 57 aligned with passage 38 to allow cable 37 to pass through case 46. The parts of the back wall of case 46 that have channels 57 are bearing and guides that prevent cable 37 from cutting into core 27. A box-shaped boss 58 having a rectangular opening 59 projects forwardly from back walls 47 and 48. The top of boss 58 has a horizontal groove or square channel 61 to receive a latch member 62 of a lock 63. Lock 63 has a lock cylinder 64 projected through a hole 66 in a handle 67. A head 68 joined to cylinder 64 is retained against the outside of handle 67 with a nut 69. Latch member 62 is secured to a rotatable body 71 of lock 63. A key (not shown) inserted into head 68 is used to rotate body 71 and latch member 62 between it's lock and unlock positions.

Handle 67 has a generally rectangular paddle 72 having a flat front surface. A pair of ears 73 and 74 joined to upper sides of paddle 72 project inwardly adjacent case side walls 49 and 51. A horizontal pin 76 extends through side walls 49 and 51 and ears 73 and 74 pivotally mounted handle 67 on case 46. As shown in FIGS. 1 and 13, paddle 72 fits in the space surrounded by flange 54 and is located in the vertical plane of flange 54. The bottom of paddle 72 has a horizontal bead 77 spaced above bottom wall 58 to allow a person's fingers 78, as shown in FIG. 14, to be inserted under bead 77 whereby when lock 63 is unlocked handle 67 can be moved, as shown by arrow 79, from a vertical closed position to a generally horizontal open position. Handle 67 is also used by a person to swing door 21 upwardly to its open position.

A hook 81 joined to the back of paddle 72 projects inwardly through hole 59 and grips cable 37. Hook 81 has an outwardly turned lip 82 providing a groove 83 for cable 37. As shown in FIG. 14, groove 83 has a small mouth 84 with a size smaller than the diameter of cable 37 so that cable 37 is forced through mouth 84 into the base of groove 83 to retain cable 37 in engagement with hook 81. Cable 37 is free to move longitudinally in groove 83. The cable 37 is not allowed to escape from groove 83 during use. The free side-to-side movement of cable 37 reduces the tolerance on the cable length. When handle 67 is moved to the open position cable 37 is pulled into boss 58 to move bolts 33 and 34 of latches 31 and 32 inwardly to release positions. When latches 31 and 32 are released handle 67 is in the up or raised position and is used to swing door 21 to its open position. The springs of latches 31 and 32 bias paddle 72 to its closed vertical position. Lock 63 is turned with a key to move latch member 62 into groove 61 thereby holding handle 67 in the closed position as shown in FIG. 14. An annular seal 85 on the outside of boss 58 around hole 59 engages paddle 72 to prevent water, dust, and dirt from flowing into the space surrounded by boss 58.

The single cable 37 is pulled through horizontal passage 38 in core 27 with a fish tape with one end of cable 37 attached to the inner end of bolt 33. The opposite end of cable 37 is not secured to bolt 34. As shown in FIG. 2, recess 39 provides access to bolt 39 and cable 37 to permit subsequent attachment of cable 37 to bolt 34. The handle and lock assembly 42 is then installed from the exterior side of door 21. As shown in FIGS. 13, handle 67 is raised to allow a special curved tool 86 having a hook 87 to pull the center of cable 37 back through opening 59. The center of cable 37 is then slipped over lip 82 into groove 83. The fish tape is used to pull cable taut forcing handle 67 to close. Case 46 is then secured to door 21 with bolts 44, as shown in FIG. 14. The non-connected cable end is removed from the fish tape and connected to the inner end of bolt 34 by using the access cut out 39 in the backside of door 21. Once this has been completed, door 21 is ready to be installed on the structure, such as a motor home. Hinge 22 pivotally secures door 21 to wall 20 as shown in FIG. 1.

Thus there has been shown and described a novel door latch system which fulfills the objects and advantages sought therefor. Many changes, modifications, variations, other uses and applications of the subject invention will, however, become apparent to those skilled in the art after considering this specification. All such changes, modifications, variations, and other uses and applications which do not depart from the spirit and scope of the invention are deemed to be covered by the invention which is limited only by the claims which follow.

I claim:

1. A latch mechanism for a door having outside and inside walls and opposite sides for closing an opening in a structure, the outside wall having a recess extended to the inside wall whereby the inside wall includes a bottom wall of the recess comprising: first and second means mountable on opposite sides of the door for locking the door to the structure, said first and second means each having a bolt movable to an unlocked position to release the door to allow the door to be moved to an open position, a single cable connected to the bolts of the first and second means, a handle and lock assembly mounted on the door operatively connected to the cable to pull the cable to move the bolts of the first and second means to unlock positions, said handle and lock assembly including a case located in said recess, said case having a back wall located in engagement with said bottom wall of the recess and a peripheral flange located in engagement with the outside wall of the door around said recess, said back wall having a boss projected outwardly away from the bottom wall providing a space between the boss and inside wall and lateral recesses adjacent opposite sides of the boss to align a portion of the cable with the space and guide the cable, means securing the case to the inside wall of the door to retain the case in the recess and hold the flange in engagement with the outside wall of the door, a handle having a hook with a groove accommodating said portion of the cable, means pivotally mounting the handle on the case for movement between first and second positions whereby when the handle is moved from the first position to the second position the cable is pulled to move the bolts of the first and second means to unlock positions to release the door, said boss having an opening open to the space and a slot, said hook extended through said opening into said space when the handle is in first position whereby the hook engages the portion of the cable in said space, and a lock mounted on the door, said lock having a latch member movable into the slot in the boss to lock the handle on the case in the first position.

2. The latch mechanism of claim 1 wherein: the first and second means are latch bolt units each latch bolt unit having a bolt movable to lock and unlock positions, and means securing the latch bolt units to opposite sides of the door.

3. The latch mechanism of claim 2 wherein: the cable has a first end secured to one bolt and a second end secured to the other bolt.

4. The latch mechanism of claim 1 wherein: the lock to lock the handle on the case includes a lock cylinder mounted on the handle, and said latch member being mounted on the cylinder for movement between lock and unlock positions relative to the slot in the boss.

5. The latch mechanism of claim 1 wherein: said handle has a generally flat member located in the plane of the flange when the handle is in the first position.

6. In combination: a door having outside and inside walls for closing an opening in a structure, the outside wall having a centrally located recess extended to the inside wall, a latch mechanism having first and second lack bolts cooperating with the structure to hold the door in a closed position, said lock bolts being movable to unlock positions to allow the door to be moved to an open position, a single cable located between the outside and inside walls and extended through the recess, said cable having opposite ends connected to the lock bolts, means mounted on the door operatively connected to the cable located in the recess to pull the cable to currently move the lock bolts to release positions, said means including a case located in the recess, said case having a back wall located adjacent said inside wall, said case having a boss extended outwardly away from said inside wall providing a space for a portion of the cable, said boss having an opening open to the space, fasteners securing the case to the inside wall of the door to retain the case in the recess, a handle having a hook extended through the opening in the boss and into said space; accommodating said portion of the cable, pivot means mounting the handle on the case for movement between first and second positions whereby when the handle is moved from the first positions to the second position the cable is pulled to move the lock bolts to unlock position to release the door, and a lock on the handle to hold the handle on the case in the first position.

7. The structure of claim 6 including: a core of insulation located between the outside and inside walls of the door, said core having a generally horizontal hole open to the recess, said cable being located in the hole in the core.

8. The structure of claim 6 wherein: the case has a flange located in engagement with the outside wall of the door.

9. The structure of claim 6 wherein: the back wall has recess means providing a channel for the cable and to guide the cable as the cable is pulled by the handle to unlock the lock bolts.

10. The structure of claim 6 wherein: the lock includes a lock cylinder mounted on the handle, and a latch member mounted on the cylinder for movement between lock and unlock positions, said boss having a groove for accommodating the latch member in the lock position thereby locking the handle on the case.

11. A handle and lock assembly for a door having an inside wall, an outside wall and a recess in the outside wall extended to the inside wall, at least one releasable latch and a cable connected to the latch operable to release the latch comprising; a case having a back wall engageable with the inside wall and a flange engageable with the outside wall when the case is located in said recess, said back wall having a boss projected outwardly away from the inside wall providing a space between the boss and the inside wall when the case is located in said recess accommodating a portion of the cable, said boss having an opening open to said space and lateral recess on opposite sides of the boss aligned with said space to align the portions of the cable in said space, a handle having a hook with a groove, said hook adopted to extend through the opening in the boss into said space whereby said portion of the cable is located in said groove, pivot means mounting the handle on the case for movement between first and second positions, said hook being located in said space when the handle is in the first position whereby when the handle is moved from the first position to the second position the cable is moved to release the latch, and a lock on the handle to hold the handle on the case in the first position.

12. The handle and lock assembly of claim 11 wherein: the includes a lock cylinder mounted on the handle, and a latch member mounted on the cylinder for movement between lock and unlock positions, said boss having a groove for accommodating the latch member in the lock position thereby locking the handle on the case.

13. The handle and lock assembly of claim 11 wherein: the handle has a generally flat member located in the plane of the flange when the handle is in the first position.

* * * * *